United States Patent [19]

Suizu et al.

[11] Patent Number: 4,592,692
[45] Date of Patent: Jun. 3, 1986

[54] PALLET LOADING APPARATUS

[75] Inventors: Dairi Suizu, Akashi; Taketoshi Kishimoto; Tadahiro Hayashida, both of Kakogawa, all of Japan

[73] Assignee: Okura Yusoki Kabushiki Kaisha, Hyogo, Japan

[21] Appl. No.: 702,939

[22] Filed: Feb. 19, 1985

[30] Foreign Application Priority Data

Feb. 23, 1984 [JP] Japan .................................. 59-33036

[51] Int. Cl.⁴ .............................................. B65G 57/03
[52] U.S. Cl. ........................................ 414/70; 414/80;
414/84; 414/36; 414/626; 414/71; 414/57;
414/753; 294/88; 294/67.32; 294/107;
294/87.1; 294/81.61
[58] Field of Search ............... 414/36, 71, 84, 626,
414/57, 67, 70, 751, 753, 729, 80; 294/88, 87.1,
105, 107, 81.61, 67.31, 67.32

[56] References Cited

U.S. PATENT DOCUMENTS

| | | | |
|---|---|---|---|
| 1,202,681 | 10/1916 | de Temple et al. | 294/107 |
| 2,668,731 | 2/1954 | Neher | 294/81.61 X |
| 2,784,923 | 3/1957 | Sepke | 294/67.32 |
| 2,841,434 | 7/1958 | Hooker et al. | 294/67.1 X |
| 3,171,550 | 3/1965 | Gajdostik et al. | 414/37 |
| 4,160,620 | 7/1979 | Farmer et al. | 294/88 X |
| 4,242,025 | 12/1980 | Thibault | 414/70 |

FOREIGN PATENT DOCUMENTS

| | | | |
|---|---|---|---|
| 241752 | 8/1965 | Austria | 294/104 |
| 3041317 | 6/1982 | Fed. Rep. of Germany | 294/88 |
| 2387882 | 12/1978 | France | 414/71 |
| 1396693 | 6/1975 | United Kingdom | 294/81.54 |

Primary Examiner—Frank E. Werner
Attorney, Agent, or Firm—James E. Nilles

[57] ABSTRACT

A pallet loading apparatus wherein an article is held by a holding device that can move freely vertically and horizontally at the article line-up position. The article is then moved and lowered onto articles on a pallet at the pallet loading position. The holding device is provided at the lower sections on its both sides with a plurality of scooping fork members, each of which has a supporting section that is supported on a shaft in such a manner that it can be opened and closed and is horizontal when it is closed. The supporting sections of the scooping fork members are provided at one or more positions of each section with joint sections and the end section of the joint sections is formed so as to bend only upwards.

1 Claim, 11 Drawing Figures

PALLET LOADING APPARATUS

BACKGROUND OF THE INVENTION

1. Field of the Invention

This invention relates to a pallet loading apparatus.

2. Description of the prior art

In the conventional pallet loading apparatus in which a package is held by a scooping open-and-close member, the support section of the open-and-close member is inserted underneath the package to hold it up, and when the package is unloaded the support section is withdrawn from under the package and it is lowered. If the movement of the open-and-close member is linear when the package is held up or unloaded, there is a disadvantage that the pallet loading apparatus is large due to the large space required for the open-and-close operation. If the movement of the open-and-close member is given by rotational motion when the load is held up or unloaded, it does not require a large space, but there is a disadvantage that the distance that the load falls is relatively long.

SUMMARY OF THE INVENTION

This invention was thought of in view of the above mentioned disadvantages. The purpose of the invention is to provide a pallet loading apparatus with an open-and-close member for scooping an article, in which the opening and closing of the openand-close member is done in a small space and the distance the load falls when unloading is short.

The invention relates to a pallet loading apparatus having a holding device which is freely movable vertically and by which horizontally and an article is held at a package line-up position and which is then moved and lowered at a pallet loading position to be stacked on a pallet. The holding device is characterized in that it is provided at its lower sections on both sides with a plurality of scooping forks that are supported on shafts so as to be able to open and close and are held horizontally when they are closed, and have a support section, and the support section of each of the scooping forks on both sides has in it one or more joint sections, and the end of the joint section can freely bend only upwards. When a package is lowered onto a pallet at the pallet loading position, the scooping forks are opened and their support sections bend to touch the lower section of the package with the joint sections.

Other purposes and features of the invention will be explained in reference to the attached drawings.

DESCRIPTION OF THE PREFERRED EMBODIMENT

The invention will be explained in detail according to an embodiment of the invention as shown in the attached drawings.

Figure 1:
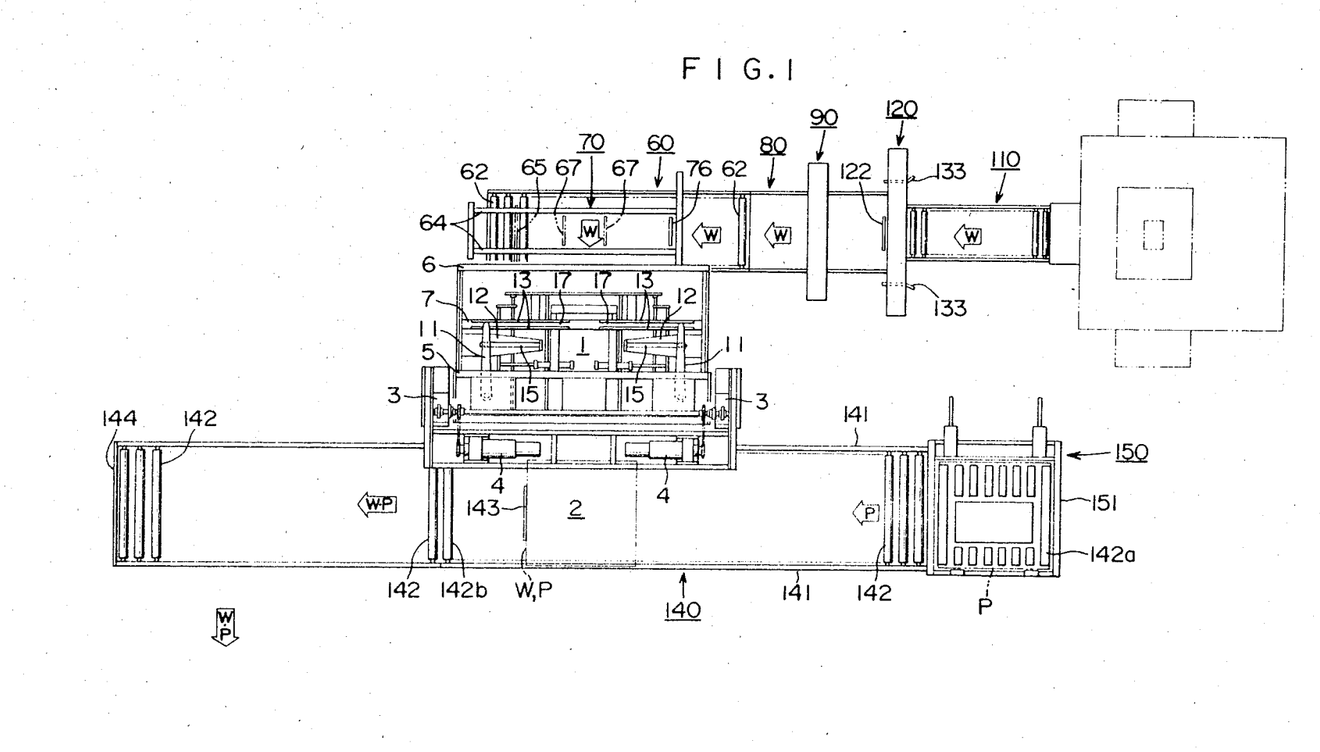
FIG. 1 is a plan view of an embodiment of the invention.
Figure 2:
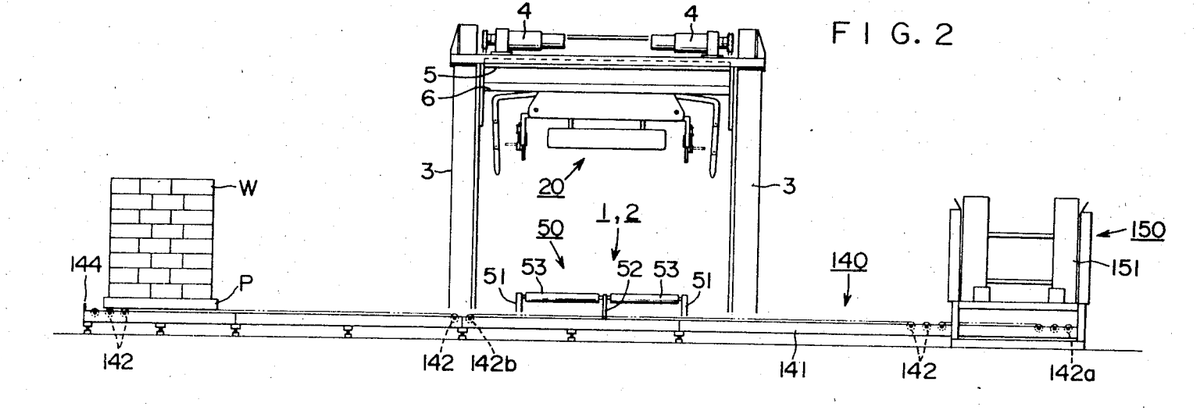
FIG. 2 is its elevation view.
Figure 3:
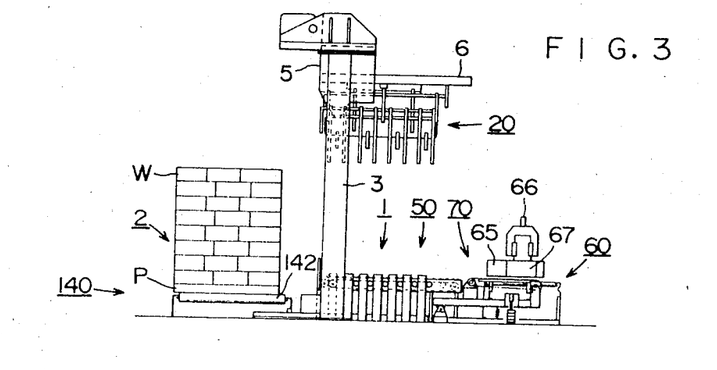
FIG. 3 is its side view.

In FIG. 1, FIG. 2 and FIG. 3 (1) is a package line-up position at which a package W is picked up and from which it is carried forward to a pallet loading position (2) where the package is deposited onto a pallet (P).

Between the package line-up position (1) and the pallet loading position (2) there are a pair of upright columns (3), one to the left and one to the right of the path that the package traverses between those positions. Between the pair of columns (3) there is provided a lift frame (5), which goes up and down by means of a pair of motors (4). A guide frame (6) that is rectangular in plan view is carried by the lift frame (5). A horizontally movable frame (7) is guided for back and forth motion by the right and left sides of this guide frame (6).

Figure 4:
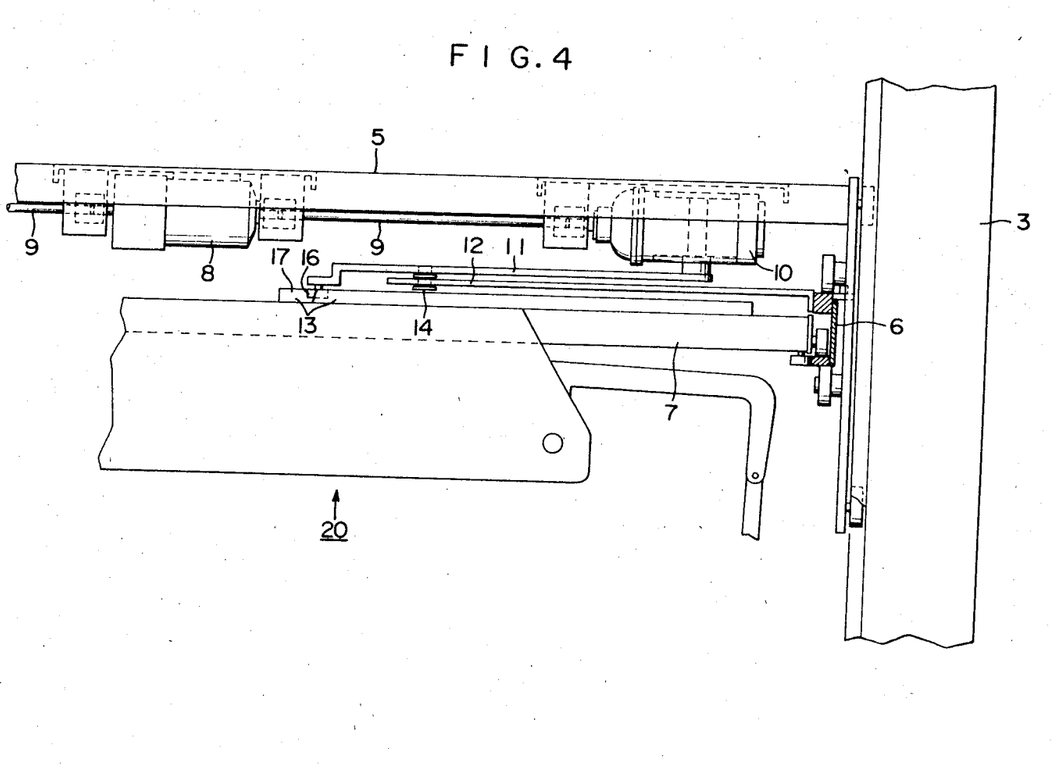
FIG. 4 is an elevation view of a part of the mechanism to move the holding device.

A motor (8) for actuating the frame (7) back and forth is provided at the center of the lift frame (5). Reduction gears (10) are connected through transmission shafts (9) to the right and left output shafts of the motor. A crank arm (11) is mounted on the output shaft at the underside of each of the reduction gears (10) on both sides. On the upper sides of the right and left sides of the guide frame (6) rail plates (12) are mounted to extend laterally, and at the same time on the upper sides of both sides of the horizontally movable frame (7) a pair of rails (13) are provided respectively extending in the same direction as that of the rail plate (12). A roller (14) with flanges is supported on a shaft at the center of each crank arm (11). The roller (14) engages a long guide hole (15) in the rail plate (12). A roller (16) that is supported on the end of the crank arm (11) engages a guide groove (17) between the pair of rails (13). When both crank arms (11) are synchronously rotated by means of the motor (8) in opposite directions, one clockwise and the other counter-clockwise, the guide frame (6) advances and retreats between the front and rear of the columns (3) by the roller (14) engaging the flanges and the long guide hole (15), and at the same time the horizontally movable frame (7) moves rapidly back and forth between the pallet loading position (2) in the front and the package line-up position (1) at the rear by engaging the roller (16) and the guide groove (17).

When the horizontally movable frame (7) is positioned at the pallet loading position (2) in the front, the guide frame (6) lies in front of the columns (3) to support the horizontally movable frame (7), and when the horizontally movable frame (7) is at the rear package line-up position (1), the guide frame (6) is at the rear of the columns (3) to support the horizontally movable frame (7).

Figure 5:
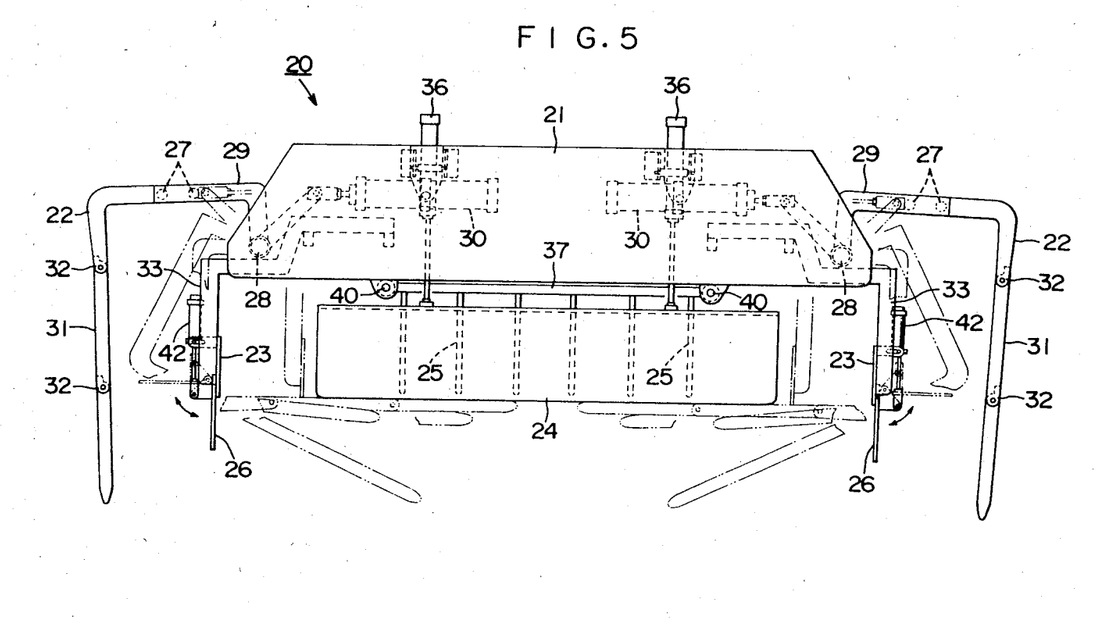
FIG. 5 and FIG. 6 are respectively an elevation view and a side view of the part of the holding device.
Figures 6, 7:
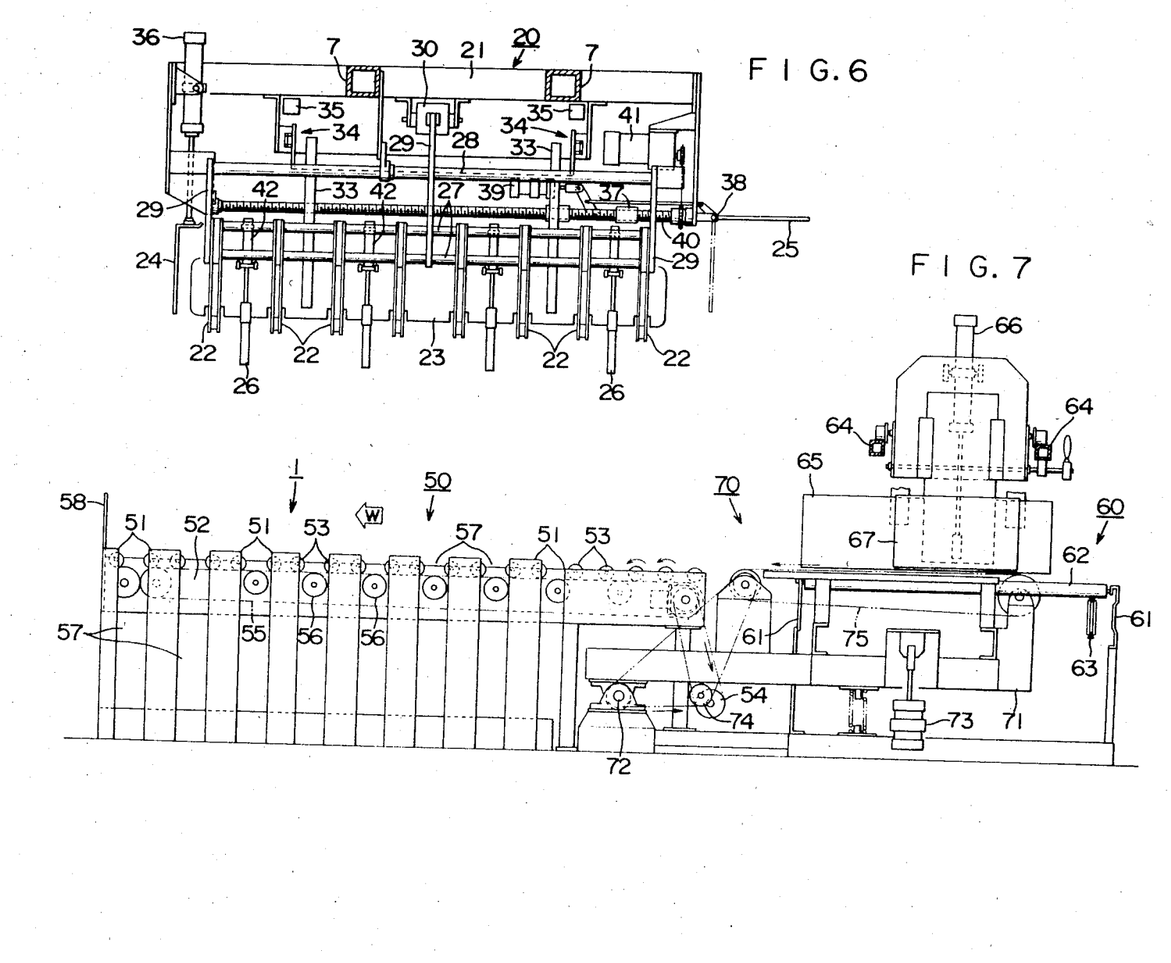
FIG. 7 is a side view of a roller conveyor placed at the package line-up position.

On the under side of the horizontally movable frame (7) a package (W) holding device (20) is provided. As seen in FIGS. 5 and 6, this device (20) consists of a support frame (21) mounted on the horizontally movable frame (7) and a set of scooping forks (22) at each of the right and left sides of the support frame (21), each set being mounted on a shaft (28) at its side of the support frame so that the forks can be opened and closed. Right and left package line-up plates (23) are also provided on the support frame (21), movable towards and from one another for left and right package line-up. A stopper plate (24) is mounted on the front of the support frame (21) in such a manner as to be capable of edgewise ascending and descending. A plurality of engaging rods (25) are provided on the lower section of the support frame (21) at the rear thereof (FIG. 6) and are mounted in such a manner as to make them capable of swinging between a downwardly projecting operative position and a rearwardly projecting inoperative position. A plurality of lower stage stopper plates (26) are mounted (FIG. 5) on the lower section of each of the package line-up plates (23) in such a manner as to be swingable between a downwardly projecting operative position and a laterally outwardly projecting inoperative position.

The forks (22) of each set, which are spaced apart in the fore-and-aft direction, are connected with one another by means of parallel fore-and-aft extending brace rods (27). Each fork (22) is rigidly connected at its upper end to a support shaft (28) which extends along its side of the support frame (21) and which is confined to rotation relative to the support frame whereby the set of forks is swung between its open and its closed position. Each of the support shafts (28) is rotated by means of an air cylinder (30).

Every fork (22) of each set is substantially L-shaped, having an elongated upper section or arm (29) and a lower supporting section (31) that normally extends at right angles to the upper section (29). The upper end of the upper section (29) has the connection to the support shaft (28), while the supporting section (31) projects from the lower end of the upper section (29) and terminates at a tip. When a set of forks (22) is in its closed position, the upper section (29) of each fork extends substantially vertically downward to dispose the support section (31) at a level below the support frame (21), while the supporting section (31) extends substantially horizontally and projects laterally inwardly from the upper section (29) to supportingly underlie a package or packages. When the set of forks is in open position, the upper section (29) of each fork projects laterally outwardly while the supporting section (31) projects downward from it.

At least one joint (32) is provided in the supporting section (31) of every fork. In the present case there are two such joints (32) that are spaced from one another along the length of the supporting section (31). In every case, each such joint (32) is spaced along the supporting section (31) from its tip end and defines an elongated swingable element of the supporting section (31) that extend from the joint (32) towards the tip end of the supporting section. Further each joint (32) confines the swingable element that thus extends from it to swinging, through positions in which that swingable element extends at acute angles to the upper section (31), to and from a limit position in which the swingable element extends at substantially a right angle to the upper section (31). are respectively supported on the support frame (21) through a plurality of arms (33) and a slider mechanism (34) so that the plates (23) can move laterally inward and outward relative to the support frame (21). The plates (23) are moved by an air cylinder (35) in opposite directions to open and close.

The stopper plates (24) are moved up and down vertically by an air cylinder (36) mounted on the front section of the support frame (21).

The plurality of engaging rods (25) are mounted on a shaft (38) that extends laterally across the rear section of the movable frame (37) with a specified distance between them. The engaging rods (25) rotate between the state of pointing vertically downwards and the state of pointing horizontally rearward by rotating this shaft (38) by means of an air cylinder (39) mounted on the movable frame (37).

The movable frame (37) provided with the engaging rods (25) and the air cylinder (39) engages a pair of screw shafts (40), and it is moved back and forth by the rotation of each screw shaft by a motor (41), so that the positions of the engaging rods (25) can be adjusted according to the size of the package and the pattern of loading of the pallet.

Each of the engaging plates (26) of the lower stage is supported on a shaft at the outside of the package line-up plates (23) on both sides, and the plate (26) rotates between the state of pointing vertically downwards and the horizontally and outwardly moved state by an air cylinder (42).

A roller conveyor (50) is provided at the package line-up position (1). This roller conveyor (50) has, as shown in FIG. 7, a standing intermediate frame (52) at its center, between a plurality of side frames (51) on each side of it that stand in a front-to-rear row and are spaced a specified distance apart to define gaps (57) between them. A plurality of rollers (53) are supported on shafts in two rows between side frame (51) on one side and the intermediate frame (52) and between the side frame (51) on the other side and the intermediate frame (52). Underneath those two rows of the rollers (53) there are endless V-belts (55) that are driven and rotated by a motor (54). The V-belts (55) are pressed against the rollers (53) by means of push up sheaves (56). A package is transferred to the package line-up position (1) from the rear.

The gaps (57) between the roller frames (51) in the row correspond to the positions of the forks (22) at both sides of the holding device (20) and permit the supporting section (31) of each fork (22) to go into those gaps (57). The gaps (57) function as insertion sections for the holding section (31).

The V-belt (55) and the push-up sheaves (56) of the roller conveyor (50) are provided on the intermediate frame (52), and they are located in the central region of the roller conveyor (50) adjacent to the intermediate frame (52). They correspond to the gap for the tip of the supporting section (31) on the fork (22) when the forks on both sides of the holding device (20) are closed. When the supporting section (31) of the fork (22) is inserted between rollers (53) through the gap (57), the tip of the supporting section (31) will not touch the V-belt (55) or the push-up sheaves (56).

A fixed stopper (58) stands at the front end of the roller conveyor (50).

At the rear of the roller conveyor (50) the end of another roller conveyor (60) which is at a right angle to the roller conveyor (50) is placed. The roller conveyor (60) constitutes a transfer route to carry packages W to the roller conveyor (50). As shown in FIG. 7 a plurality of rollers (62) mounted on shafts are provided between side frames (61). A motor (not shown) under the rollers (62) drives an endless V-belt (63) which presses onto the rollers (62). The rollers (62) can thereby move a package W to the rear end of the roller conveyor (50) at the package line-up position (1) from the right side.

A pair of guide rails (64) are provided above the end of the roller conveyor (60) parallel to the direction of the package transfer route. An end stopper (65) is provided on the lower section of the guide rail (64), and also two intermediate spacers (67) are provided away from the stopper (65) on the base side (right side in FIG. 1) of the roller conveyor (60). Those spacers are under the guide rail (64) and driven by an air cylinder (66) to be lifted or to move laterally. The end stopper (65) and intermediate spacers (67) are for positioning packages W to the rear of the package line-up position (1) that is at the front end of the roller conveyor (60). Their positions can be adjusted along the guide rail (64) according to the size of a package W and the pattern of pallet loading.

At the front end of the roller conveyor (60) a package transfer mechanism (70) is provided. This mechanism (70) supports as shown in FIG. 7 one end of the frame (71) at a lower position of the roller conveyor (50) at the package line-up position (1) through a shaft (72). The other end of the frame (71) can move up and down below the roller conveyor (60) by means of an air cylinder (73). Above the end of this frame (71) a plurality of endless V-belts (75) are provided and they are driven and rotated by a motor (74). Each of those V-belts (75) is positioned between adjacent rollers (62) at the end of the roller conveyor (60). The air cylinder moves the V-belts (75) up and down so that they emerge or sink between the rollers (62).

A separation stopper (76) is provided at the central region of the roller conveyor (60) as shown in FIG. 1. This stopper goes above the rollers (62) through rollers (62) or sinks between them by means of an air cylinder not shown. This separation stopper separates packages on the end region of the roller conveyor (60) where the transfer mechanism (70) is provided.

Figure 8:
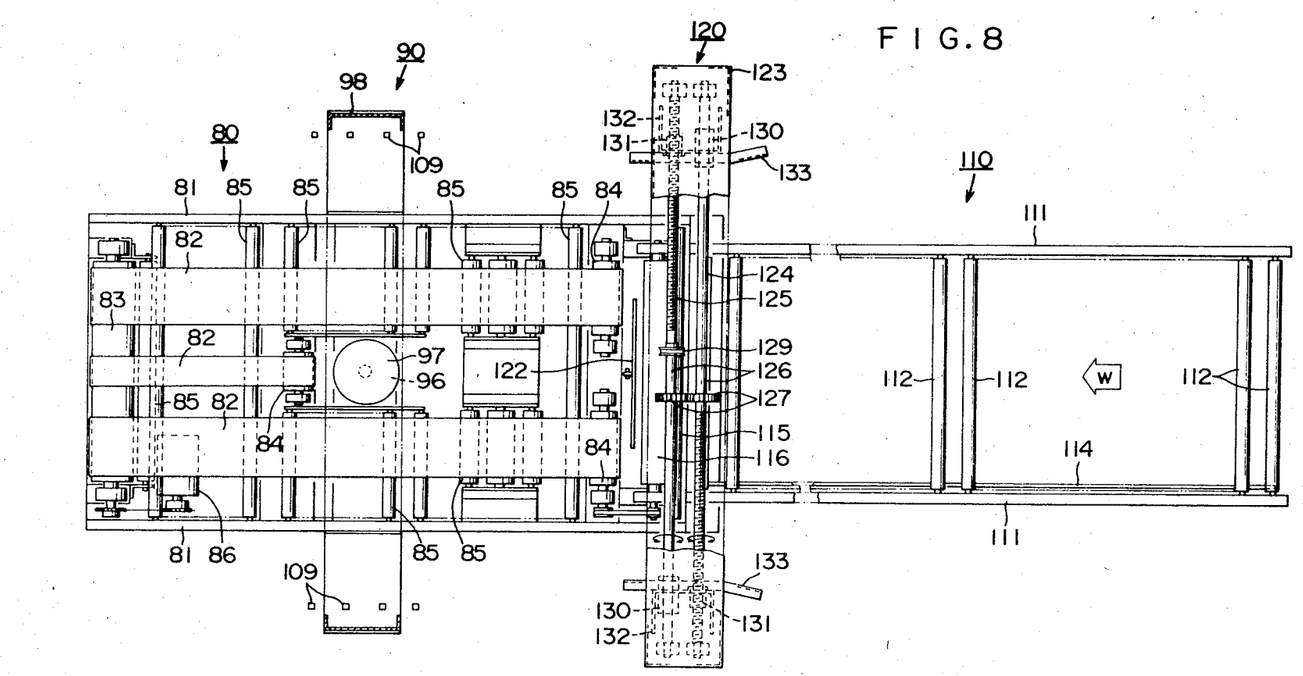
FIG. 8 and FIG. 9 are respectively a plan view and a side view of a conveyor that constitutes the transfer route for carrying in packages.
Figure 10:
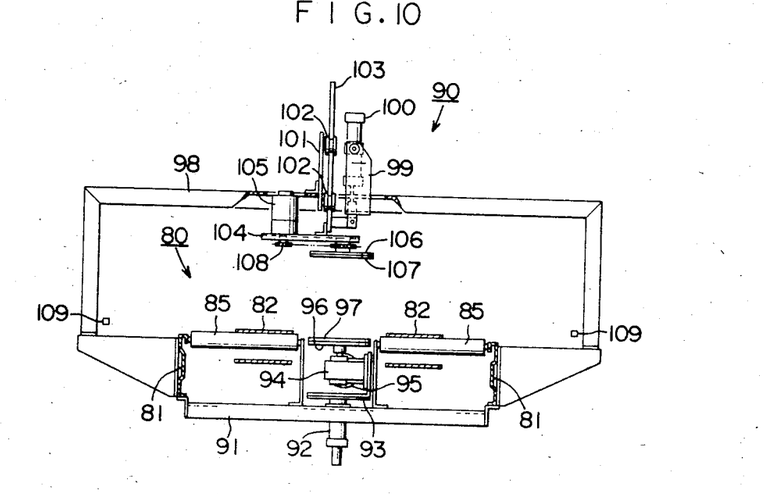
FIG. 10 is a longitudinal cross-sectional view of a device to change the direction of packages.

The end of a belt conveyor (80) is connected to the base of the roller conveyor (60) in line with it. This belt conveyor (80) constitutes the transfer route with the roller conveyor (60), and as shown in FIG. 8 and FIG. 10 a plurality of end-less flat belts (82) are arranged between the front and rear side frames (81) through a driving pulley (83) and a plurality of follower pulleys (84) and the upper rotating sides of the flat belts (82) are supported by a plurality of support rollers (85). The flat belts (82) are driven round by a motor (86) through the driving pulley (83) to carry a package W from the right.

Figure 9:
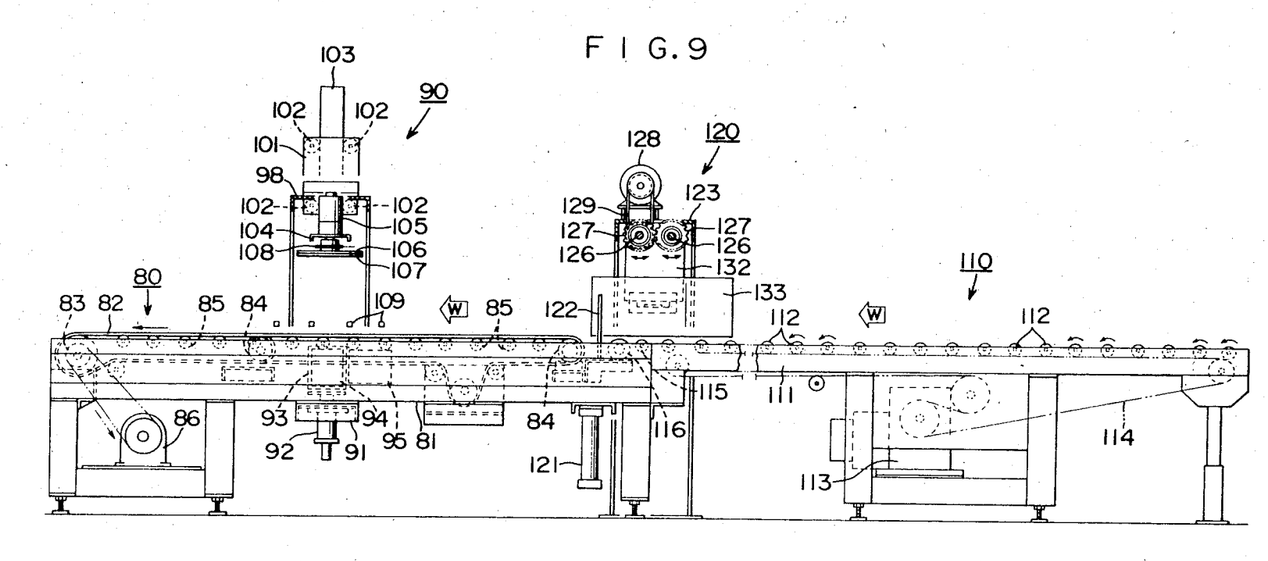

A device (90) for changing the orientation of a package W is provided on the belt conveyor (80). This device (90) comprises, as shown in FIGS. 8, 9, and 10, an air cylinder (92) under the central position between front and rear and between the right and left sides of the belt conveyor (80) supported by a transverse frame (91). The air cylinder faces upwards. The rod of the air cylinder (92) is provided with a support plate (93) that is shaped like the letter L. This supporting plate is provided with a reduction gear (94), and a motor (95) is connected to the reduction gear (94). A discshaped lower rotating body (96) is mounted on the output shaft of the reduction gear (94) on its upper side and it is positioned between the flat belts (82). The upper side of the rotating body (96) is covered with a non-slip member (97) such as a rubber plate. Further, an air cylinder (100) facing downwards is mounted above the rotating body (96) through a bridging frame (98) and a pair of mounting plates (99), and a plurality of guide rollers (102) are supported on shafts through the bridging frame (98) and the mounting plate (101). The plurality of guide rollers (102) engage and support a lift plate (103) so that it can be moved up and down. The lower end section of the lift plate (103) and the rod of the air cylinder (100) are connected, and at the lower end of the lift plate (103) a support plate (104) is mounted. A motor (105) with a reduction gear is provided on one side of the support plate (104). The lower section of the other side of the support plate (104) supports a disc shaped upper rotating body (106) by a shaft. The rotating body is coaxial with the shaft of the lower rotating body (96). The lower side of the upper rotating body (106) is covered with a non-slip member (107) such as a rubber plate. The shaft of the upper body (106) and the output shaft of the reduction gear at the lower side of the motor (105) are connected through a transmission mechanism (108) such as sprocket and chain. With this arrangement air cylinders (92) and (100) extend or withdraw synchronously, and at the same time the motors (95) and (105) drive synchronously, and thereby the lower rotating body (96) and the upper rotating body (106) mutually approach or go away, and when they approach together, they rotate 90° at the same time.

The device (90) to change the orientation of packages and the belt conveyor (80) are controlled by a photoelectric detector (109) that is provided at the transfer route of the belt conveyor (80) so as to correspond to the device (90).

The end of the roller conveyor (110) is connected to the base of the belt conveyor (80) in line with it. The roller conveyor (110) constitutes the transfer route with the roller conveyor (60) and belt conveyor (80), and as shown in FIG. 8 and FIG. 9 a plurality of rollers (112) are provided between the front and rear side frames (111). An endless V-belt (114) presses onto the lower section of each roller (112) and is driven and rotated by a motor (113). The roller conveyor (110) carries a package W to the belt conveyor (80) from the right.

Between the end section of the roller conveyor (110) and the base of the belt conveyor (80) a free roller (115) and a roller (116) interlocked to the follower pulley (84) at the base of the belt conveyor (80) are mounted on shafts and positioned between both side frames (81) of the belt conveyor (80) and are supported on a shaft.

Figure 11:
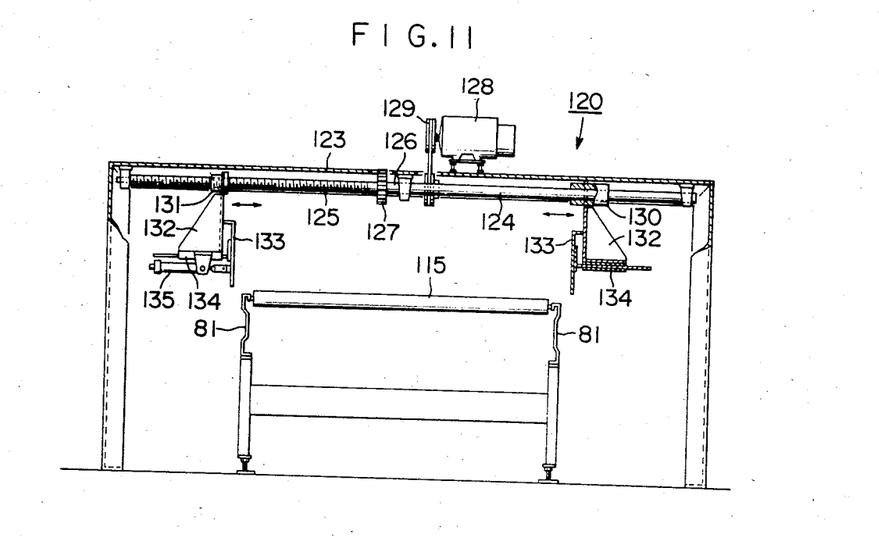
FIG. 11 is a longitudinal cross-sectional view of a device to determine the package line-up position.

Between the end section of the roller conveyor (110) and the base of the belt conveyor (80) a device (120) for determining package line-up position of each package W is provided. This device (120) provides as shown in FIG. 8, FIG. 9 and FIG. 11 a front stopper (122) that emerges or sinks on the transfer route between the roller (116) and the follower pulley (84) of the belt conveyor (80) by means of an air cylinder (121), and supports above its right side through a bridging frame (123) a pair of shaft rods (126) each of which consists of a guide rod section (124) and a coaxial male thread rod (125) that are arranged end to end. The shaft rods (126) are arranged in opposite directions and can rotate back and forth in parallel. A pair of meshed gears (127) are mounted on the pair of shaft rods (126). One of the shaft rods (126) and a motor (128) on the bridging frame (123) are connected through a transmission mechanism (129) consisting of pulley and V-belt. Sliding cylinders (130) fit into the guide rods (124) of the pair of shaft rods (126) and female thread cylinders (131) fit the male thread rod sections (125). Support frames (132) are mounted on the sliding cylinders (130) that are adjacent at the front and rear ends of the shaft rods (126) and the female thread cylinders (131). Inside of both support frames (132) plate shaped pushers (133) are supported by them through a guide mechanism (134) so that they can freely approach or go away from each other, and the pushers (133) are formed to be driven to advance or retreat by an air cylinder (135). A package W transferred by the roller conveyor (110) from right to left is stopped by the front stopper, and at the same time the pushers (133) are driven to approach each other through the pair of shaft rods (126) driven synchronously by the motor (128), and furthermore, if needed, an air cylinder (135) makes both pushers (133) approach each other to grasp a package W.

At the pallet loading position (2) the central section of a roller conveyor (140) is provided that intersects at a right angle the roller conveyor (50) at the package line-up position (1) that is at the rear of the pallet loading position (2). This roller conveyor (140) has a plurality of rollers (142) between the front and rear side frames (141). The rollers are laid in parallel and supported on shafts. Each of the rollers on the span from the roller (142a) at the base to the front roller (142b) at the pallet loading position (2) is driven by power, but each of the rollers in front are free, so that a pallet P is moved from right to left.

At the central section of the roller conveyor (140) a stopper (143) is provided which emerges between the rollers (142) to rise above them or sinks between them by means of an air cylinder not shown (see FIG. 1). The stopper (143) positions pallets P at the pallet loading position (2), and a fixed stop (144) is also provided that stands at the end of the roller conveyor (140) and stops the pallet P.

A pallet supply device (150) is provided at the base of the roller conveyor (140). This device (150) is well known. It is capable of stacking a plurality of pallets P into a receiving frame (151) that is positioned above the roller conveyor (140). The pallet supply device (150) feeds the bottom pallet of those pallets successively onto the roller conveyor (140).

Next, the operation of the whole will be explained.

In this explanation it is assumed that the forks on both sides of the holding device (20) and the package line-up plates (23) are open, the stopper plate (24) is at the end of its descent, the engagement plates (25) and the lower engagement plates (26) are raised, the horizontally movable frame (7) is moved to the package line-up position (1) and the vertically travelling frame is at the end of its descent, while the ends of the support section (31) of the fork (22) are positioned outside of the gap (57) of the roller conveyor (50), at the same time the line-up plates (23) on both sides are positioned outside of the roller conveyor (50), and the stopper (24) is positioned behind the fixed stopper (58) of the roller conveyor (50) and is waiting for a package to arrive at it.

When a pallet P is fed to the base of the roller conveyor (140) from the pallet receiving frame (151) of the pallet supply device (150), this pallet P is transferred to the pallet loading position (2) by the roller conveyor (140) and there its position is fixed by the stopper (143) which has been raised.

When in this state a package W is fed to the base of the roller conveyor (110), the package W is transferred to the package line-up positioning device (120) and abuts the front stopper (122) that has been raised, and it is grasped because the pushers (133) on both sides approach each other. The alignment of the package is thereby arranged as specified, and at the same time the package occupies the central position of the transfer route.

This package line-up positioning device (120) is effective for packages that are easily deformed or that are cardboard bundles, and gives stability to subsequent package stacking.

Then the front stopper (122) of the package line-up positioning device (120) goes down and simultaneously the pushers (133) on both sides go away from each other, and the package is then carried to the belt conveyor (80) through the rollers (115) and (116).

The package line-up positioning device (120) waits for the next package after a package W has passed it and the front stopper (122) has ascended.

Then when a package W is transferred to the device (90) to change the orientation of the package W, the orientation of the package W is detected by a photoelectric detector (109), and according to the necessity of the pallet loading pattern the belt conveyor (80) stops and the device (90) which changes the package orientation actuates.

This operation consists of rising of the lower rotating body (96) against the package W that is positioned above the lower rotating body (96) and at the same time descending of the upper rotating body (106) to lift and grasp the package, synchronous rotation through 90° by the lower rotating body (96) and the upper rotating body (106) to change the orientation of the package, descending after this of the lower rotating body (96) and ascending of the upper rotating body (106) at the same time to lower the package onto the belt conveyor (80), and driving again of the conveyor (80) after changing the orientation of the package W horizontally by 90°.

The device (90) is effective for handling a package such as a cardboard bundle that easily changes its shape. Its direction can be changed without changing the form of the package, and subsequent package stacking will be stable.

The package W is transferred from the belt conveyor (80), and then it is stopped by the end stopper (65). Then the package that follows is stopped by the preceeding package W or by the spacer (67) that descends if needed for the pattern of pallet loading.

When a predetermined number of packages for one stage in the pallet loading pattern are lined up at the end section of the roller conveyor (60), the separation stopper (76) ascends to separate a group of packages for one stage from the following packages, and then the package transfer mechanism (70) actuates with the V-belt (75) ascending and rotating to drive and transfer the packages for that one stage to the roller conveyor (50) at the package line-up position (1), and these packages are stopped by the fixed stopper (58) at the end.

When the packages for one stage are transferred from the end of the roller conveyor (60) to the roller conveyor (50) the V-belt of the package transfer mechanism (70) descends, and at the same time the rotation of the V-belt (75) stops, and the separation stopper (76) descends. If the intermediate spacer (67) has been lowered at this time, it ascends.

When thus the packages which make up one stage in the pattern of the pallet loading are lined up on the roller conveyor at the package line-up position (1), the forks (22) on both sides of the holding device (20) and the package line-up body that have been at standby close, and the engagement rods (25) descend. The sides of the packages to make up one stage are lined up straight on the front and rear and right and left sides by the stopper (58) of the roller conveyor (50), the engaging plates (25) of the holding device (20), and the package line-up plates (23) on both sides. The support sections (31) of the forks (22) at both sides of the holding device (20) are inserted between the rollers (53) through the gaps (57) of the side frames (51) of the roller conveyor (50) and the support sections (31) go underneath the packages.

Next, the lift frame (5) ascends and the support sections (31) of the forks (22) scoop up the packages for one stage, and when the holding section (31) ascends to a little above the stopper (58) of the roller conveyor (50), or a little above the stacked packages W when packages W are loaded on the pallet P and the height of those packages W is higher than the stopper, then the lift frame (5) stops ascending and the horizontally movable frame (7) moves to the pallet loading position (2) to move the packages W for one stage of the stack on the pallet, onto the top of the pallet or onto the top of the packages W on the pallet, and the lift frame (5) descends, if needed, and positions correctly those packages W on the pallet or on the packages on the pallet.

When the horizontally movable frame (7) moves and then stops, the packages W are liable to shift forward by their inertia, but because this is prevented by the stopper plate (24), in practice this does not occur.

Next, the lower engaging plates (26) on both sides descend to abut both sides of the pallet P or both sides of the packages on the pallet.

When packages for the first stage on the pallet are loaded, it is not always necessary to lower the lower engaging plate (26).

Then the forks (22) on both sides open to lower packages W onto the pallet P or onto the packages stacked on the pallet, and the stopper plates (24) and engaging plates (25) ascend and move laterally.

When the forks (22) open, their support sections (31) swing about the joints (32) to remain substantially horizontal and slide lengthwise through the small gap between the packages and the pallet (or the packages on the pallet), and thereby the distance that the packages fall is made extremely short, because each support section (31) is provided with joint sections (32). At this time the support sections (31) rub along the supported packages and the pallet (or the packages on the pallet), but this rubbing does not disturb the stage of loading because the supported packages W are held in place by the package line-up plate (23), and the pallet P (or the packages W loaded on the pallet P) are held in place by the lower engaging plate (26).

Then the package line-up plate (23) opens, and simultaneously the lower engaging plates (26) ascend and move horizontally.

After the holding device (20) ascends to the height in which it can move horizontally past the fixed stopper (58) of the roller conveyor (50), the horizontally movable frame (7) moves to the package line-up position (1), and then the lift frame (5) descends and the stopper plate (24) also descends to return to the standby state.

When packages W are thus loaded on the pallet P in a specified pattern, the stopper (143) for the pallet P descends and at the same time the pallet P is transferred to the end section of the roller conveyor (140) and is stopped by the stopper (144) with the horizontally movable frame (7) moved to the package line-up position (1).

The pallet P at the end of the roller conveyor (140) is carried away by a fork lift or a similar device.

The front stopper (122) of the package line-up device (120) has the function of keeping a distance between packages W, but a package W can be grasped and stopped by the pushers (133) on both sides of the package line-up positioning device (120). It is, therefore, possible to keep a distance between adjacent packages with those pushers (133) without providing the front stopper (122).

EFFECTS OF THE INVENTION

According to the invention explained in the foregoing, since in the pallet loading apparatus the scooping forks for holding packages are supported on shafts at the lower sections of both sides of the holding device, no large space for opening and closing the forks is required, and furthermore since the joint sections are provided in the supporting section of the fork and the ends of those joint sections can swing only upwards, the supporting sections remain horizontal under the lower side of a package as they are withdrawn from underneath the packages W, there is no danger that the ends of the supporting sections will hit the pallet or packages obliquely, and the distance that the packages fall can be made small. There is, therefore, no damage to packages.

When a package line-up open-and-close member is provided inside of the scooping forks on both sides of the holding device, packages are prevented from moving by the friction between packages and the support section when the supporting section of the fork is withdrawn from underneath a package, and thereby packages can be lowered to a specified position.

Further, when the lower engaging members are provided at the lower section of the package lineup open-and-close member of the holding device and they are made to move upwards, the packages on the pallet are kept from moving by the friction between the support section of the scooping forks and the package on the pallet when the support section is withdrawn.

We claim:

1. In a pallet loading apparatus comprising means defining a package supporting surface at a package pickup station, means defining a pallet supporting surface at a pallet station which is spaced in a forward direction from said package pickup station, a movable frame, guide means confining said movable frame to movement in said forward direction and an opposite rearward direction and to vertical movement down to and up from a level at which the movable frame is spaced above said surfaces, and a pair of sets of fork members, one set adjacent to each of the laterally opposite sides of said frame, the fork members of each set being spaced apart in said forward direction and being constrained to partake of movements of said frame but being movable in unison relative to said frame between a closed position in which they cooperate with the fork members of the other set to support a package and an open position, the sets of fork members thus being cooperable with one another and said frame for picking up packages at said package pickup station, carrying them forward to said pallet station and depositing them on a pallet at said pallet station, said pallet loading apparatus being characterized by:

A. a supporting shaft on said frame for each set of fork members, each said support shaft
  (1) extending along the lateral side of said frame that is adjacent to its set of fork members and
  (2) being confined to rotation on said frame;

B. every fork member of each set being substantially L-shaped and comprising
  (1) an elongated upper section with upper and lower ends which has at its upper end a rigid connection with its supporting shaft and which in said closed position projects downward to a level beneath said frame, and (2) an elongated supporting section having one end connected to the lower end of said upper section and having an opposite tip end, said supporting section in said closed position projecting laterally inwardly beneath the frame from said upper section for supportingly underlying a package, said rigid connection enabling the fork members of the set to be swung between said closed position and said open position wherein said upper section projects laterally outwardly from the frame and said supporting section projects downwardly;

C. the supporting section of every fork member having a joint (1) which is spaced along the supporting section from the tip end thereof and which defines an elongated swingable element of the supporting section that extends from said joint towards said tip end and (2) about which said swingable element is confined to swinging, through positions in which it extends at acute angles to said upper section, to and from a limit position in which it extends at substantially a right angle to said upper section; and D. a pair of package engaging members on said frame, one adjacent to each of said laterally opposite sides thereof, each having an upper portion and a lower portion, (1) said upper portion of each package engaging member being beneath said frame and
  (a) defining an upright surface that extends in said directions and opposes the upper portion of the other package engaging member and
  (b) being laterally inside the set of fork members at its side of the frame, and (2) said lower portion of each package engaging member
  (a) being so connected with its upper portion as to be confined to movement relative thereto between
    (i) an operative position in which a package engaging surface on the lower portion is below and substantially coplanar with said upright surface on its upper portion and
    (ii) a retracted position in which the lower portion is mainly disposed laterally outwardly of its upper portion and at a level no lower than that of the bottom edge of its upper portion, and
  (b) having apertures through which the supporting sections of the fork members at its side of the frame can extend, (3) said package engaging members being movable laterally relative to said frame towards and from one another to cooperate in confining packages between them against lateral displacement as the sets of fork members are swung to their open positions.

* * * * *